March 10, 1931. H. A. W. WOOD 1,795,816
MEANS FOR PREVENTING TRANSMISSION OF VIBRATION
AND NOISE IN MACHINE CONSTRUCTION
Filed April 10, 1925 4 Sheets-Sheet 1
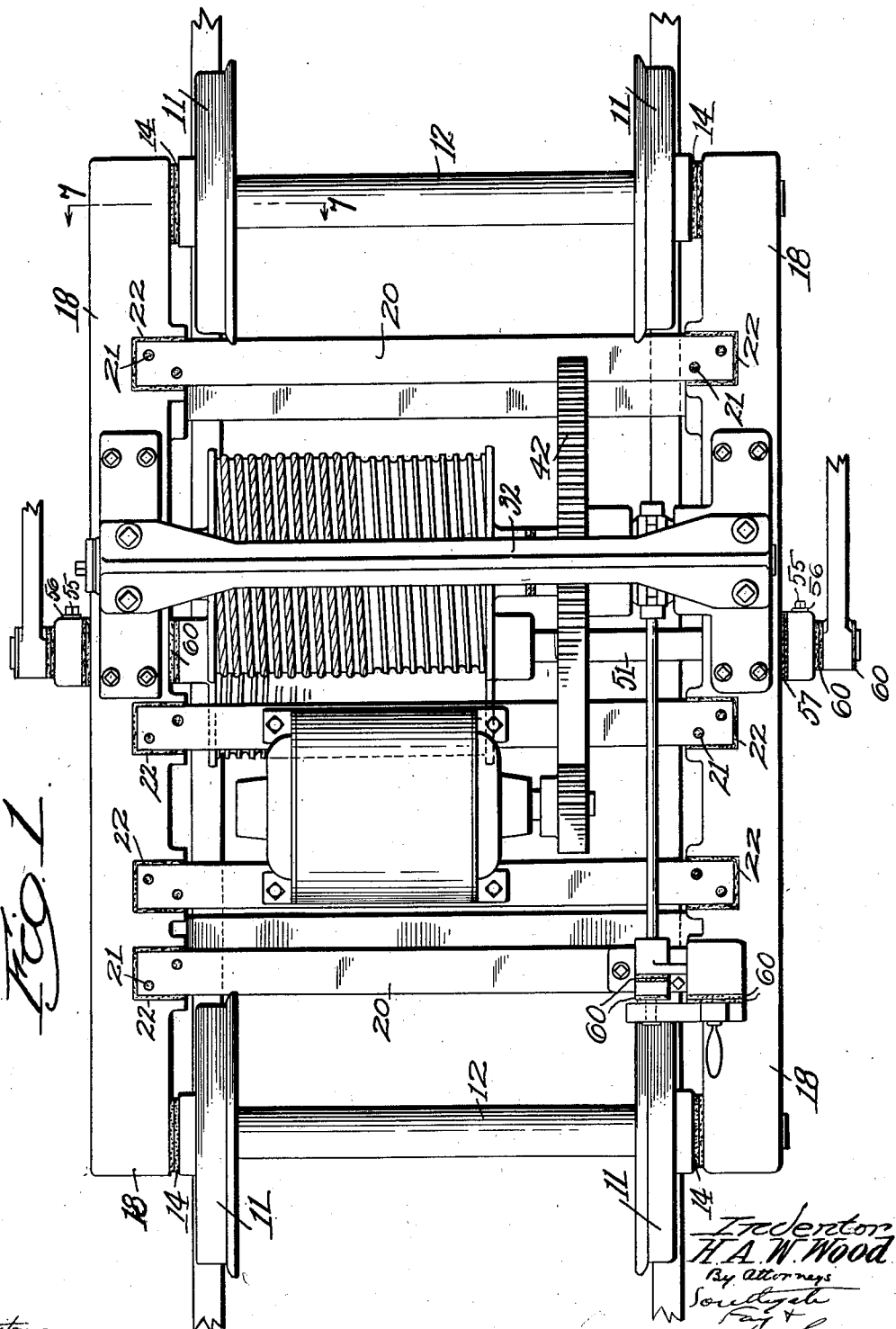

March 10, 1931. H. A. W. WOOD 1,795,816
MEANS FOR PREVENTING TRANSMISSION OF VIBRATION
AND NOISE IN MACHINE CONSTRUCTION
Filed April 10, 1925 4 Sheets-Sheet 2
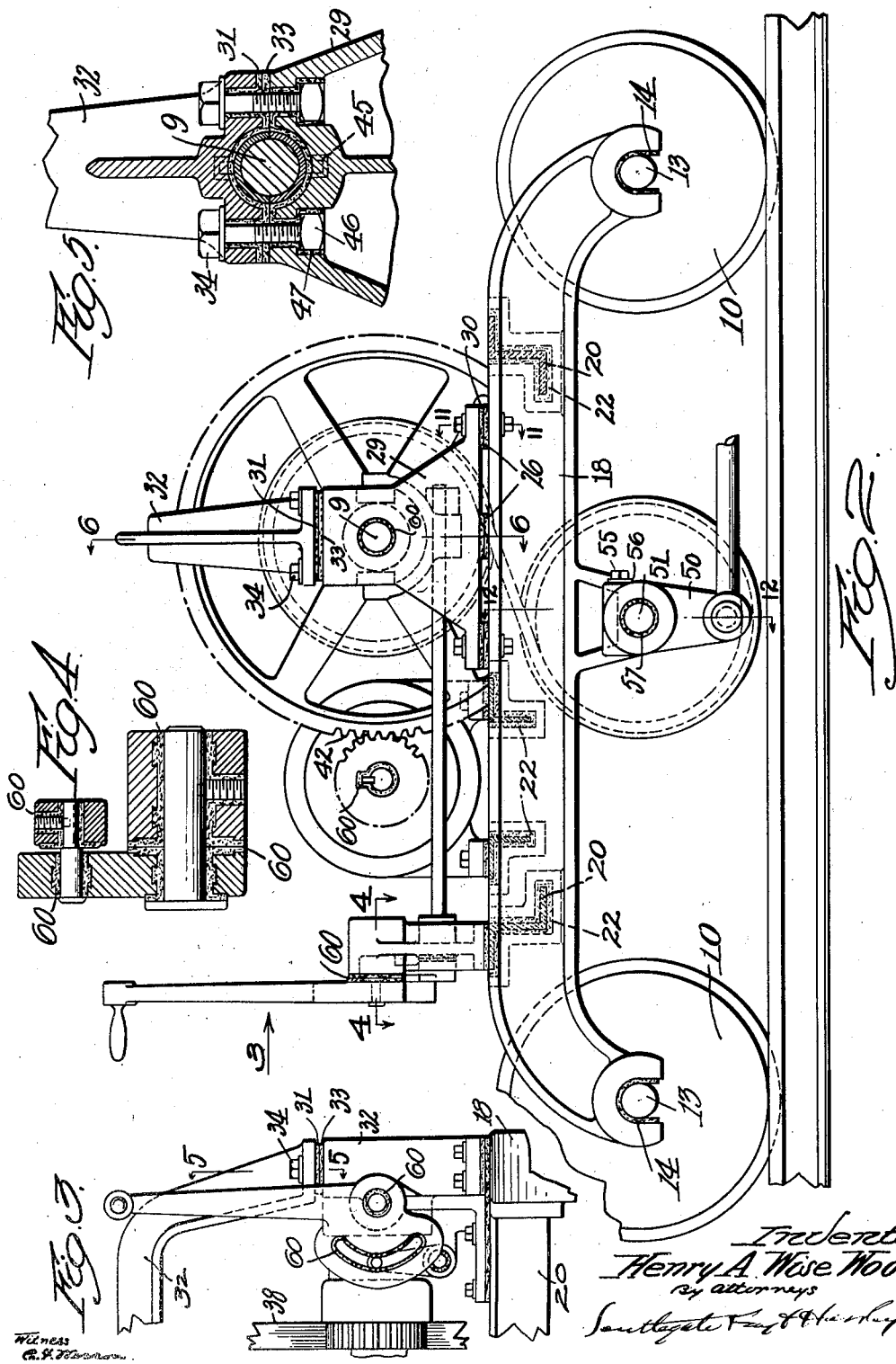

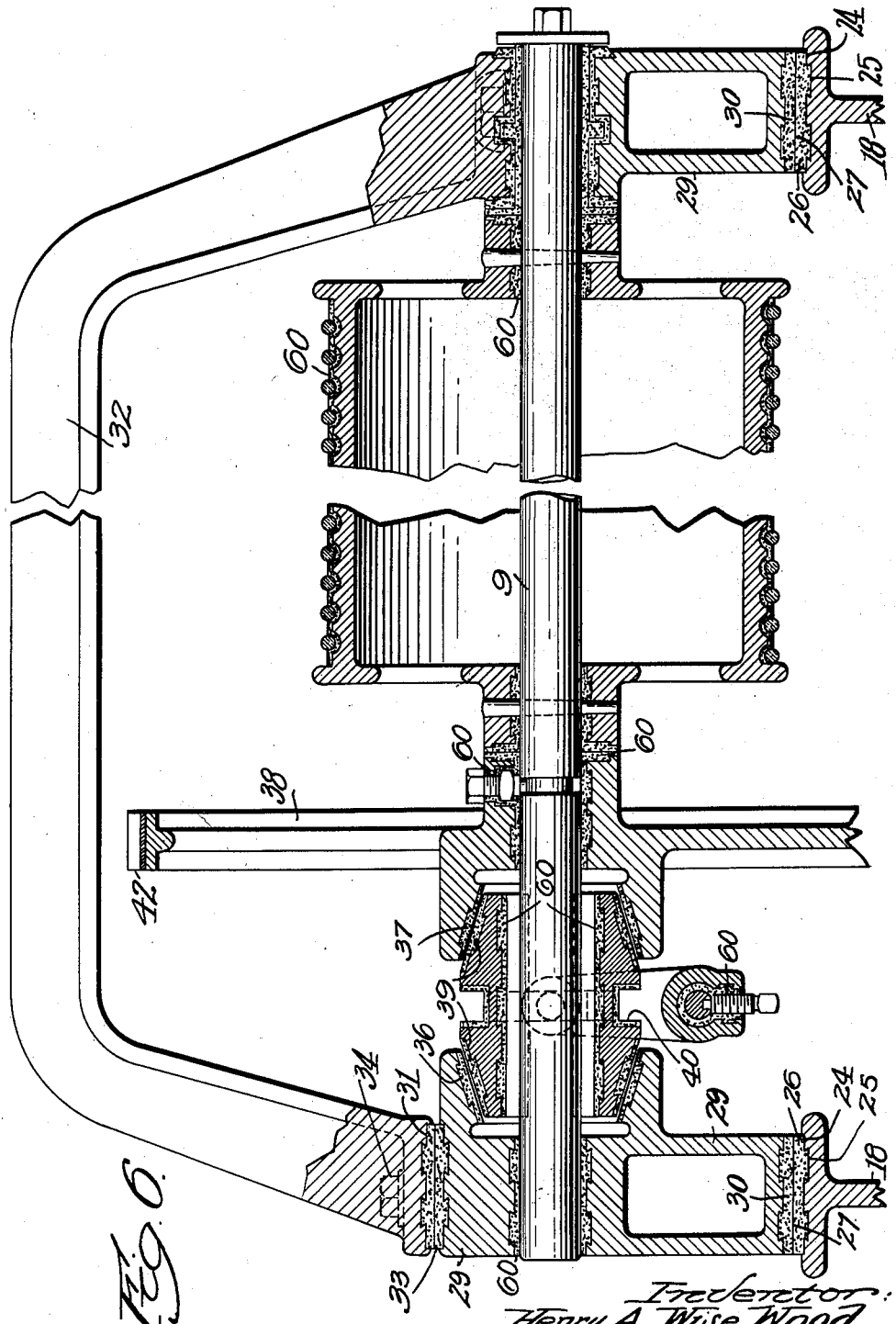

March 10, 1931.  H. A. W. WOOD  1,795,816
MEANS FOR PREVENTING TRANSMISSION OF VIBRATION
AND NOISE IN MACHINE CONSTRUCTION
Filed April 10, 1925   4 Sheets—Sheet 4
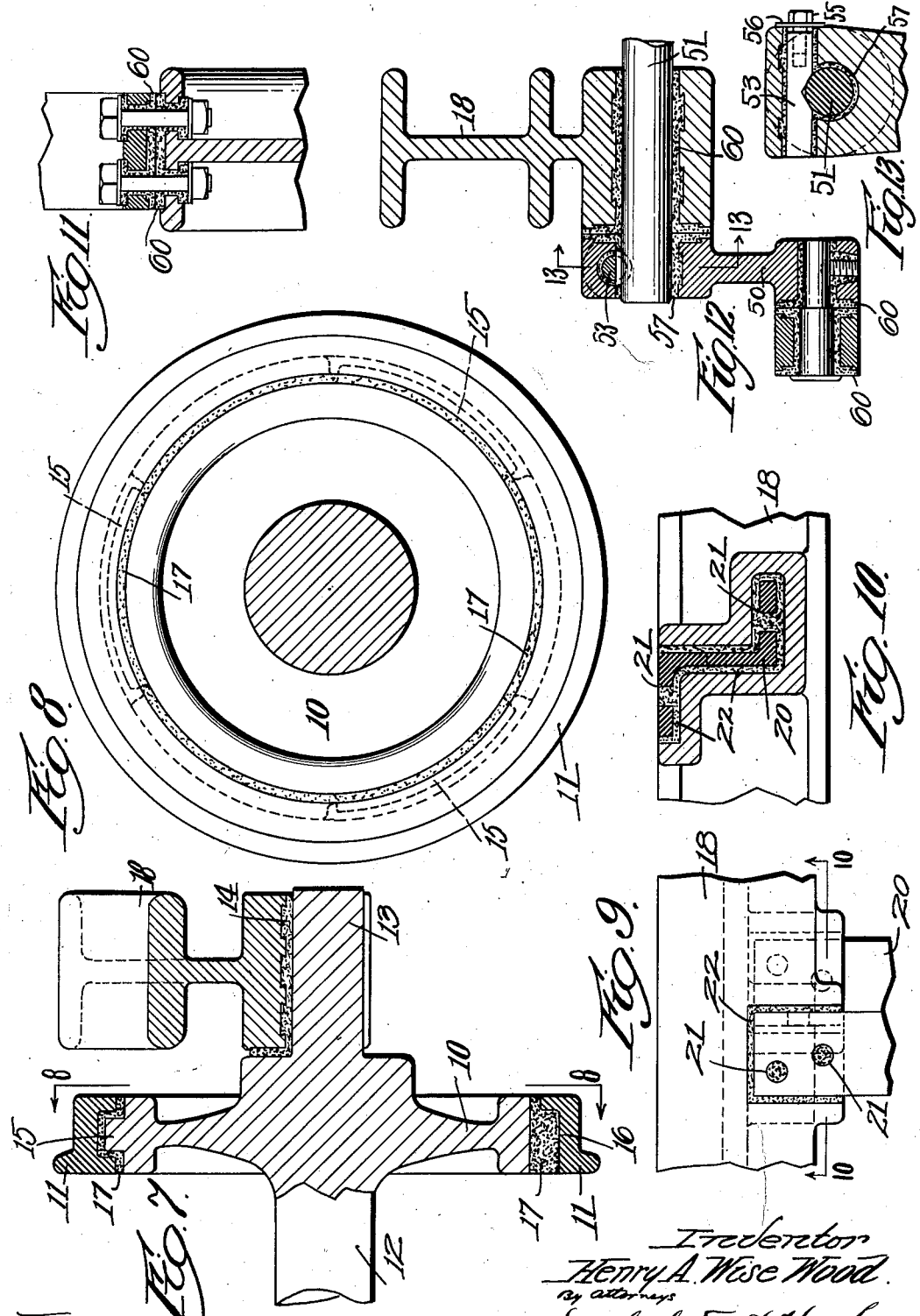

Patented Mar. 10, 1931

1,795,816

UNITED STATES PATENT OFFICE

HENRY A. WISE WOOD, OF NEW YORK, N. Y.

MEANS FOR PREVENTING TRANSMISSION OF VIBRATION AND NOISE IN MACHINE CONSTRUCTION

Application filed April 10, 1925. Serial No. 22,238.

This invention relates to the construction of machinery. The principal object of the invention is to provide a construction for joining parts of a machine or frame in such a way as effectively to cushion the elements and absorb the vibrations of each element so that any vibration of one element will not be transmitted to another against which it is fixed, or on which it moves.

Another object of the invention is to eliminate the noise resulting from the transmission of vibrations from one part of the machine to the other and the loosening of such joints and separation of the parts.

I accomplish these objects according to this invention by placing seats or bodies of comparatively soft metal between the iron or steel elements that are connected to make up the frame or other part of the machine. The invention involves the application of these principles to any kind of machine and includes the several specific constructions, as will appear hereinafter.

Reference is to be had to the accompanying drawings, in which

Fig. 1 is a plan of a machine articulated in a manner corresponding to this invention;

Fig. 2 is a side elevation of the same;

Fig. 3 is a fragmentary end elevation thereof;

Fig. 4 is an enlarged sectional view on the line 4—4 of Fig. 2;

Fig. 5 is a sectional view on the line 5—5 of Fig. 3;

Fig. 6 is a sectional view on the line 6—6 of Fig. 2;

Fig. 7 is a sectional view through the axle of one of the wheels on the line 7—7 of Fig. 1;

Fig. 8 is an end view of the same, sectioned on the line 8—8 of Fig. 7;

Fig. 9 is a plan of an arrangement for connecting the cross pieces of the frame with the sides;

Fig. 10 is a sectional view on the line 10—10 of Fig. 9;

Fig. 11 is a sectional view on the line 11—11 of Fig. 2;

Fig. 12 is a sectional view on the line 12—12 of Fig. 2; and

Fig. 13 is a sectional view on the line 13—13 of Fig. 12.

Where two parts of hard metal (iron, steel or even brass or bronze) come together in a machine, whether the connection is a fixed one or a movable one like a bearing for a shaft, the constant transmission of vibration from one metal element to another produces noise and detrition. When there is relative motion between two surfaces this wear is in addition to the ordinary wear due to friction.

The noise is an audible manifestation of metallic vibration. The vibration involves countless repeated blows of one hard metal on the other. The result is that the hard metal surfaces, being brittle, are subjected to a process of detrition that grows worse more rapidly after it has been carried on long enough to produce a noticeable increase in noise. If one metal is more brittle than the other, the former takes most of this wear, but in any event, where there is noise there is wear, other than that due to the friction of relatively moving parts.

In order to deaden, and usually eliminate, the noise, and almost entirely avoid this cause for wear, I connect the various parts and elements of a machine, whether stationary or movable, by cast seats or masses of soft material that will not transmit vibration. At all points at which an element of a machine is supported I entirely separate it from its supporting part or parts by these soft cast seats or cushions so as to prevent contact of hard metal surfaces against each other. This prevents chattering, noise, and wear from this particular source.

This principle is carried out in the same way whether the supported element is carried by one supporting part or by several, and whether it is fixed in stationary position or supported to have a rotary, reciprocating or other motion. The soft material is usually lead or any of its soft alloys. Wherever I speak of metal of course I do not confine myself to pure metal but mean to include alloys.

I have shown the invention as applied to a machine which is mounted on wheels 10 running on tracks, these wheels having rims or tires 11 which would create a great deal of noise if slight flats developed on their peripheries. These wheels, as usual, are mounted on an axle 12 with a journal at 13 which runs in a babbitted bearing 14. The flange of the wheel is formed with three or more arcuate projections 15 which are inserted in spaces 16 in the rim 11. These projections are turned to a proper angle within this rim. A quantity of the soft metal, as mentioned above, is poured in the space between to form a soft cushion 17. These several cushions prevent the two elements of the metal coming apart. They also prevent any surface of the wheel flange 10 coming into direct contact with the rim 11. I have found that any vibration or noise which may come from such a wheel slightly out of true fails to be transmitted from the rim to the flange and thence to the axle or any other part of the machine, because of this cushion of soft metal interposed between the two. Of course noise is not created, and any chattering tendency is obviated. This soft metal cushion does not chip off or wear under severe strains or vibrations of one of the parts and the durability of the wheel is very materially increased. This description of the wheel may be applied to various other parts in which this invention is shown, the same principle being employed throughout.

The wheels through their soft metal bearings 14 carry side frames 18, which with cross bars 20 constitute the body of the vehicle. These cross bars are of structural steel in the present case and are located between the two side frames of the machine so as to act as braces. I have shown in Figs. 9 and 10 one of these structural steel elements in the form of a Z-bar 20. Through this holes 21 are punched near the ends. The end of this Z-bar is placed in a suitable bracket in the frame or other part of the machine. A mold, not shown, is placed in position and soft metal at 22 is poured in so that a very effective lock is obtained. This embodies the principles already described in connection with the wheel as the vibrations from one part of the frame to the other are practically stopped by this layer of soft metal.

On the side frames 18 which are made preferably in the form of I-beams, I form depressions 24 and within their surfaces I provide dove-tailed notches 25 and place a mold thereover and cast a soft metal cushion 26 against this prepared surface but having a plain flat bearing surface 27 located beyond the boundary of the I-beam. Then on the pillow block 29 above, which constitutes an element of the machine, I place a similar seat 30 at the bottom and bring these two seats together so that one rests upon the other and provide a support from the side frame to the pillow block by means of these seats which constitute cushions and prevent the passage of vibrations as has been stated. These parts are secured together in stationary position by bolts or the like.

Two pillow blocks 29 carry a cross frame 32 in a similar way. This cross frame, shown more particularly in Fig. 6, is provided with a layer or seat 31 of a soft metal, as previously described, secured to the under side. The pillow block 29 is provided with a similar soft metal seat 33 for cooperating with the seat 31, as has been stated. This permits of the fastening of the cross frame to the pillow block by any fastening means that may be desired, such as a bolt 34, without lessening the efficiency of the soft metal seats. The contact between the cross frame and the pillow block is entirely between two soft surfaces producing a cushion between the two parts so that vibration in one is deadened and not transmitted to the other. This is the principle throughout.

This pillow block is provided with a soft metal seating surface 36 and on a gear 38 is a similar soft metal seating surface 37 both of conical form and both applied in the manner which has been described. In Fig. 6 I have shown two conical clutch faces 39 which when shifted back and forth will produce a rotary motion in the shaft 9 or stop it, as may be desired. It will be noticed that contrary to most of the connections which have been described above in this case these clutch faces 36, 37 and 39 are not intended for constant and permanent connection with each other but they come into operation in accordance with the shifting of the clutch. This shows a distinct application of this invention having the same objects. The wear due to the movements of the clutch is not lessened, but all deterioration due to vibration is eliminated.

I have shown in the clutch another way in which the invention can be applied as a groove 40 around the clutch which is engaged by the yoke for shifting the clutch is treated in a similar manner on all three sides. In that way the operation of the clutch does not produce the noise usually accompanying this action on other clutches of this sort. Here again the surfaces protected by the soft metal are not constantly in contact or fastened to each other but are wearing surfaces.

The gear 38 which is a driven member adapted to be connected with the shaft 9 for the purpose of driving the drum is also constructed in accordance with this invention. Its teeth 42 are covered on the exterior with a non-vibration metal, such as has been described, so as to avoid the usual noise produced by gears of this nature.

Throughout the drawings I have shown in various places surfaces and connecting seats or cushions 60 of soft metal and provided with wearing, bearing or supporting surfaces which are cast so as to fit each other, as for example, the holes within the drum at 43 and the like.

In Fig. 5 I have shown a method of keeping a bushing from getting out of place. Here the bushing is provided with a pair of lugs 45 which are an integral part of the bushing. They are inserted in suitable holes formed in the bearing and these holes are lined with the soft metal. In this view also a nut 46 is shown as held in place by a soft metal lining 47 while the screw is fastened therein. The nut is square or hexagonal so that it cannot turn in the soft metal which surrounds it.

In Figs. 12 and 13 I have shown the application of this invention for fastening a lever 50 to a shaft 51. The purpose of the lever and shaft not being necessary to understand this invention, I am not describing them. I place a pin 53 with a notch in one side up against the shaft 51, this notch straddling the shaft, as indicated in Fig. 13. In the end of the pin is a screw 55 with a plate 56 and by this screw the pin is forced up against the shaft so as to bear against it with considerable force but a space is left all around the shaft and pin and dove-tailed depressions formed in it and filled with a soft metal at 57. In this way the soft metal poured in surrounds the pin and the shaft. The pin 53 is located in a hole extending across the hub of the lever 50.

In all these cases and various others designated 60 the machinery is constructed and assembled in such a way as to eliminate the transmission of vibration from one element to another and prevent the noise that comes from this vibration. As the parts are protected from the constant pounding on each other caused by the vibration the life of the machine is very materially lengthened. These results are secured in various ways, as indicated in these drawings and on various parts of this machine and can be secured in practically all arts where it may be desirable to use it. The same principles apply wherever two pieces of iron, steel, or other hard metal, rest one on the other or where they move in contact with each other. In other words, it relates to stationary joints as well as bearing surfaces for moving parts.

Although I have illustrated and described numerous modifications of this invention, I am aware of the fact that they are all constructed in accordance with the same general principle and that the invention can be carried out in a great many other forms and in all classes of machinery without departing from the scope of the invention as expressed in the claim.

Therefore I do not wish to be limited to the details of construction herein shown and described, but what I do claim is:—

The combination with a machine frame, of an element of hard metal to be supported thereby in fixed stationary position thereon, and a plurality of independent soft metal seats cast at all points between the frame and the element at which they come against each other to constitute the supporting means for said element and keep the iron or steel surfaces of the frame and element out of contact at all points, for preventing the transmission of vibrations between the frame and element and preventing noise and deterioration due to the transmission of vibrations.

In testimony whereof I have hereunto affixed my signature.

HENRY A. WISE WOOD.